United States Patent
Birnbaum et al.

(10) Patent No.: US 8,352,643 B2
(45) Date of Patent: Jan. 8, 2013

(54) HAPTICALLY ENHANCED INTERACTIVITY WITH INTERACTIVE CONTENT

(75) Inventors: David M. Birnbaum, Oakland, CA (US); Danny A. Grant, Laval (CA); Robert W. Heubel, San Leandro, CA (US)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 12/895,161

(22) Filed: Sep. 30, 2010

(65) Prior Publication Data

US 2012/0084467 A1    Apr. 5, 2012

(51) Int. Cl.
G06F 3/00    (2006.01)
G06F 3/048   (2006.01)

(52) U.S. Cl. .......................................... 710/16; 715/780
(58) Field of Classification Search ............... 710/16; 715/780
See application file for complete search history.

(56) References Cited

U.S. PATENT DOCUMENTS

| | | | |
|---|---|---|---|
| 6,978,320 B2* | 12/2005 | Nonaka | 710/5 |
| 2005/0198376 A1* | 9/2005 | Kotzin | 709/238 |
| 2007/0143625 A1* | 6/2007 | Jung et al. | 713/182 |
| 2011/0061017 A1* | 3/2011 | Ullrich et al. | 715/780 |

OTHER PUBLICATIONS

Petar Gredelj, Logitech WingMan Force Feedback Mouse, Jul. 23, 2000, benchmark hardwae_website, 1-10.*
Logitech's WingMan Cordless RumblePad Sets PC Gamers Free, Sep. 2, 2001, 1.*
Dan Frommer, 15 Things You Can Remote Control With Your iPhone, Jul. 21, 2009, Business Insider, 1.*
Johnson, et al., "Sympathetic Interfaces: Using a Plush Toy to Direct Synthetic Characters", CHI 99, May 15-20, 1999, pp. 152-158 and 626.

* cited by examiner

*Primary Examiner* — Hyun Nam
(74) *Attorney, Agent, or Firm* — Pillsbury Winthrop Shaw Pittman LLP

(57) ABSTRACT

Interactive content may be presented to a user that is manipulating a peripheral. One or more state parameters that are related to the position of the peripheral may be determined. The peripheral may be identified from a plurality of possible peripherals. The interactive content may be adjusted based at least in part on the one or more position parameters and/or the identification of the peripheral. Haptic feedback to be provided to the user may be determined based at least in part on the one or more position parameters and/or the identification of the peripheral.

10 Claims, 4 Drawing Sheets

Peripheral 202

Accessory 204

Actuator 208

Wireless Transmitter/Receiver 210

Actuator Control 212

Identifying Features 214

Base Device 206

Actuator 208

Wireless Transmitter/Receiver 210

Actuator Control 212

Identifying Features 214

FIG. 2

Peripheral 302

- Actuator 304
- Wireless Transmitter/Receiver 306
- Actuator Control 308
- Identifying Features 310
- Electronic Display 312
- Display Control 314
- User Interface 316
- Subscriber ID Module Card 318

FIG. 3

HAPTICALLY ENHANCED INTERACTIVITY WITH INTERACTIVE CONTENT

FIELD OF THE INVENTION

The invention relates to haptically enhanced interactivity with interactive content being conveyed to a user by a content output appliance, wherein the content output appliance is under control of one or more processors that control the output of the interactive content based on one or more position parameters of a peripheral being manipulated by the user.

BACKGROUND OF THE INVENTION

Users may interact with virtual objects within a virtual environment in a number of manners. In some cases, users may manipulate a physical object in the real world in order to interact with a virtual object. Such interactions may involve augmented reality technology, which may integrate 2D and/or 3D virtual objects into live video that is digitally processed and "augmented" with the 2D and/or 3D virtual objects. In other words, this digital processing can mix real and virtual worlds together, in real and/or near-real time. Conventionally, visual and/or audio feedback may provide a sense of interaction with virtual objects to users. For example, a virtual object may be presented to a user on a display where the virtual object can be seen as moving with or without accompanying sound effects. In existing systems, however, no physical sense of interaction with virtual objects is provided to users.

SUMMARY

One aspect of the invention relates to a system configured to present interactive content to a user that is manipulating a peripheral. The system may include a content output appliance configured to output interactive content to the user and a processor configured to execute computer program modules. The computer program modules may include a position module, a peripheral identification module, a content module, and a haptics module. The position module may be configured to determine one or more position parameters that are related to the position of the peripheral. The peripheral identification module may be configured to identify the peripheral from a plurality of possible peripherals. The content module may be configured to adjust the interactive content output by the content output appliance based on the one or more position parameters. The haptics module may be configured to determine haptic feedback to be provided to the user. The haptics module may be configured to determine the haptic feedback based on the identification of the peripheral and the one or more position parameters.

Another aspect of the invention relates to a peripheral configured to enhance the interactivity of interactive content being conveyed to a user by a content output appliance. The content output appliance may be under control of one or more processors that control the output of the interactive content based on one or more position parameters of the peripheral. The peripheral may include an actuator, a wireless receiver, an actuator control, and one or more identifying features. The actuator may be configured to generate haptic feedback for the user. The wireless receiver may be configured to receive information from the one or more processors defining one or more feedback parameters of the haptic feedback to be generated by the actuator. The actuator control may be configured to control the actuator to generate haptic feedback for the user in accordance with the received information defining the one or more feedback parameters. The one or more identifying features may identify the peripheral to the one or more processors from other peripherals that are usable with the interactive content such that the one or more feedback parameters communicated from the one or more processors to the peripheral are dependent on the identifying features of the peripheral.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates a peripheral configured to enhance the interactivity of interactive content being conveyed to a user by a content output appliance, in accordance with one or more implementations of the invention.

FIG. 3 illustrates another peripheral configured to enhance the interactivity of interactive content being conveyed to a user by a content output appliance, in accordance with one or more implementations of the invention.

DETAILED DESCRIPTION

Figure 1:
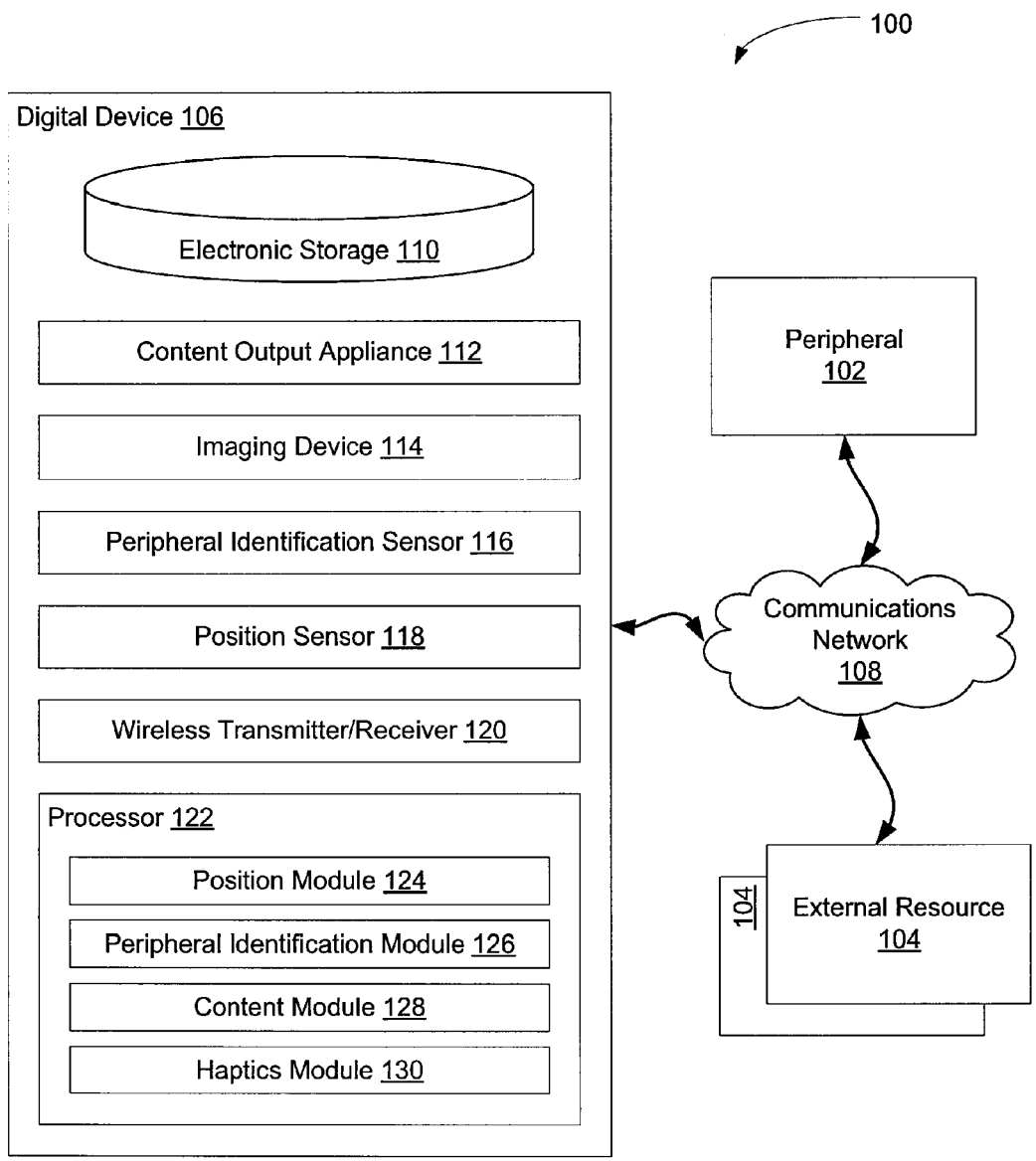
FIG. 1 illustrates a system configured to present interactive content to one or more users manipulating one or more peripherals, in accordance with one or more implementations of the invention.

FIG. 1 illustrates a system 100 configured to present interactive content to one or more users manipulating one or more peripherals, in accordance with one or more implementations of the invention. Interactive content may include a representation of the real world, a representation of a virtual environment, a representation of a user, a representation of a real-world object, a virtual object, real and/or artificial sounds, other content, and/or combinations thereof. Exemplary implementations provide haptic technologies, or "haptics", to enhance interactivity with interactive content. Haptics may include tactile and/or kinesthetic (force) feedback technology that takes advantage of a user's sense of touch by applying forces, vibrations, motions, and/or other touch feedback to the user. This may provide a more compelling and complete user experience while interacting with interactive content.

In some implementations, the system 100 may include at least one peripheral 102, one or more external resources 104, at least one digital device 106, and/or other components. Components of the system 100, the peripheral 102, the external resources 104, and/or the digital device 106 may be operatively linked via one or more electronic communication links. For example, such electronic communication links may be established, at least in part, via a communications network 108, which may include the Internet and/or other networks. It will be appreciated that this is not intended to be limiting, and that the scope of this disclosure includes implementations in which the peripheral 102, the external resources 104, and/or the digital device 106 are operatively linked via some other communication media.

The peripheral 102 may include a physical object, a physical device, and/or a combination thereof that can be manipulated by a user to interact with interactive content. Such manipulation of the peripheral 102 may include translating, rotating, deforming, and/or otherwise moving the peripheral 102. Examples of physical objects that may constitute the peripheral 102 may include consumer products such as toys, beverage containers, packaging, magazines, figurines, cards (e.g., sports cards, game cards, gift cards, and/or other cards), books, sporting/fitness equipment, collectible items, and/or other consumer products; a body part of a user (e.g., hand, head, face, torso, and/or other body part); a piece of paper and/or cardstock bearing graphics, which may or may not have been printed by a user; and/or other physical objects. Physical devices that may be included in the peripheral 102 may include, for example, a mobile telephone, a digital music player, a personal digital assistant, a Smartphone, a wrist watch, an e-book reader, a laptop computer, a tablet computer, a remote control, a wearable computer (interactive clothing/accessories), a computing/interactive digital media device implanted in or on the user's body, and/or other physical devices. Generally, however, anything manipulatable or able to be interacted with by a user may constitute the peripheral 102, in accordance with exemplary implementations. Exemplary peripherals that may constitute the peripheral 102, in accordance with one or more implementations of the invention, are described further in connection with FIGS. 2 and 3.

The external resources 104 may include sources of information, hosts and/or providers of interactive content outside of the system 100, external entities participating with the system 100, and/or other resources. In some implementations, some or all of the functionality attributed herein to the external resources 104 may be provided by resources included in the system 100.

The digital device 106 may be configured to present interactive content to users, and to facilitate interaction with the interactive content to users manipulating the peripheral 102. As depicted in FIG. 1, the digital device 106 may include one or more of electronic storage 110, a content output appliance 112, an imaging device 114, a peripheral identification sensor 116, a position sensor 118, a wireless transmitter/receiver 120, at least one processor 122, and/or other components. By way of non-limiting example, the digital device 106 may include one or more of a desktop computer, a mobile telephone, a digital music player, a personal digital assistant, a Smartphone, a wrist watch, an e-book reader, a laptop computer, a tablet computer, a remote control, a wearable computer (interactive clothing/accessories), a computing/interactive digital media device implanted in or on the user's body, and/or other computing platforms.

It will be appreciated that one or more of the constituent components of the digital device 106 may be combined into a single component with functionalities attributed herein to one or more constituent components of the digital device 106. It will be appreciated that, while the constituent components of the digital device 106 are depicted in FIG. 1 as being collocated, this may not be the case. In some implementations, one or more components of the digital device 106 may be physically located apart and separate from other components of the digital device 106. In such implementations, separate components of the digital device 106 may be communicatively coupled (by wire or wirelessly) to one or more other components of the digital device 106. Communicative coupling may be provided by the communications network 108.

The electronic storage 110 may comprise electronic storage media that electronically stores information. The electronic storage media of the electronic storage 110 may include one or both of system storage that is provided integrally (i.e., substantially non-removable) with the digital device 106 and/or removable storage that is removably connectable to the digital device 106 via, for example, a port (e.g., a USB port, a firewire port, etc.) or a drive (e.g., a disk drive, etc.). The electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may store software algorithms, information determined by processor 122, information received from peripheral 102, information received from the external resources 104, and/or other information that enables the digital device 106 to function as described herein.

The content output appliance 112 may be configured to output interactive content to the user. Interactive content may be outputted visually, audibly, and/or haptically. Interactive content may be provided to the content output appliance 112 for outputting from the electronic storage 110, the processor 122 and/or modules thereof, the external resources 104, and/or other sources. According to exemplary implementations, the content output appliance 112 may include an electronic display (e.g., monitor or screen), an electronic sound transducer (e.g., speaker), and/or other content output appliances. The content output appliance 112 may output interactive content that is haptically perceivable. For example, an electronic sound transducer included in content output appliance 112 may be configured in such a way as to output ranges of energy and at locations so to be perceived by the user's haptic perceptual system. This haptic output may be independent of, coordinated with, or in place of additional dedicated haptic output devices such as actuators.

The imaging device 114 may be configured to capture information related to a visual representation of the surroundings of the digital device 106 or components thereof. The surroundings may include a user, a peripheral 102, the physical environment of the user, and/or other visual representations. The visual representation may include one or more still images, video, and/or other visual representations. Information captured by the imaging device 114 may be provided to the content output appliance 112, the processor 122 and/or modules thereof, and/or other components of the system 100. The imaging device 114 may include, by way of non-limiting example, a digital camera, a web-camera, an analog camera, a 3D camera, a stereo camera, and/or other imaging devices.

The peripheral identification sensor 116 may be configured to generate an output signal that conveys information that identifies the peripheral 102. In some implementations, the peripheral identification sensor 116 may be configured to identify the peripheral 102 from a plurality of other peripherals. The peripheral identification sensor 116 may identify the peripheral 102 visually in some implementations. In such implementations, the peripheral identification sensor 116 may be the imaging device 114. According to some implementations, the peripheral identification sensor 116 may identify the peripheral 102 by remote sensing. Remote sensing of the identity of the peripheral 102 may include RFID, image recognition, optical code identification and/or translation, GPS or other location sensor, wireless connection signal strength, network address, wireless protocols (e.g., Bluetooth), wired connection and/or other remote sensing technologies. The peripheral identification sensor 116 may provide an identification of the peripheral 102, such as by an output signal, to the processor 122 and/or modules thereof, and/or other components of the system 100.

The position sensor 118 may be configured to sense a position of the peripheral 102 in the real world. The position sensor 118 may sense the position of the peripheral 102 visually, in some implementations. In such implementations, the position sensor 118 may be the imaging device 114. In accordance with some implementations, the position sensor 118 may sense the position of the peripheral 102 by remote sensing. Remote sensing of the position of the peripheral 102 may include triangualation based on RFID, WiFi, or other wireless communication protocol, capacitive field sensing, optical or other types of motion tracking, access to data from device-embedded sensors such as magnetometer, accelerometer/gyroscope, and/or other remote sensing techniques. The position sensor 118 may be configured to generate an output signal that conveys information related to the position of the peripheral 102. Such an output signal may be provided to the processor 122 and/or modules thereof, and/or other components of the system 100. In some implementations, the position sensor 118 may include one or more sensors carried by peripheral 102. For example, the position sensor 118 may include one or more of an accelerometer, a gyroscope, a digital compass, and/or other sensors configured to generate output signals conveying information related to the position and/or motion of peripheral 102.

The wireless transmitter/receiver 120 may be configured to wirelessly transmit information to and/or wirelessly receive information from one or more components of the system 100. As such, the wireless transmitter/receiver 120 may include a wireless transmitter, a wireless receiver, and/or a combined wireless transmitter and receiver. Information transmitted or received by the wireless transmitter/receiver 120 may be related to haptic feedback to be delivered to the user.

The processor 122 may be configured to provide information processing capabilities in the digital device 106. As such, the processor 122 may include one or more of a digital processor, an analog processor, a digital circuit designed to process information, an analog circuit designed to process information, a state machine, and/or other mechanisms for electronically processing information. Although the processor 122 is shown in FIG. 1 as a single entity, this is for illustrative purposes only. In some implementations, processor 122 may include a plurality of processing units. These processing units may be physically located within the same device, or the processor 122 may represent processing functionality of a plurality of devices operating in coordination. For example, processor 122 may include a first processor included in digital device 106 and a second processor included in peripheral 102. The first processor and the second processor may be in communication with each other, and may cooperate to provide the functionality attributed herein to processor 122.

As is shown in FIG. 1, the processor 122 may be configured to execute one or more computer program modules. The one or more computer program modules may include one or more of a position module 124, a peripheral identification module 126, a content module 128, a haptics module 130, and/or other modules. The processor 122 may be configured to execute modules 124, 126, 128, and/or 130 by software; hardware; firmware; some combination of software, hardware, and/or firmware; and/or other mechanisms for configuring processing capabilities on the processor 122.

It should be appreciated that although modules 124, 126, 128, and 130 are illustrated in FIG. 1 as being co-located within a single processing unit, in implementations in which the processor 122 includes multiple processing units, one or more of modules 124, 126, 128, and/or 130 may be located remotely from the other modules. The description of the functionality provided by the different modules 124, 126, 128, and/or 130 described below is for illustrative purposes, and is not intended to be limiting, as any of modules 124, 126, 128, and/or 130 may provide more or less functionality than is described. For example, one or more of modules 124, 126, 128, and/or 130 may be eliminated, and some or all of its functionality may be provided by other ones of modules 124, 126, 128, and/or 130. As another example, processor 122 may be configured to execute one or more additional modules that may perform some or all of the functionality attributed below to one of modules 124, 126, 128, and/or 130.

The position module 124 may be configured to determine one or more position parameters that are related to the position of one or more peripherals (e.g., the peripheral 102). Position parameters may include information related to the position of a peripheral relative to a user, the digital device 106, and/or other point of reference; the orientation of the peripheral; the size of the peripheral; and/or other information. In some implementations, the position module may be configured to determine the one or more position parameters based, at least in part, on an output signal of the position sensor 118. Information from the imaging device 114 may be utilized to determine the one or more position parameters, in accordance with some implementations.

The peripheral identification module 126 may be configured to identify a peripheral (e.g., the peripheral 102) from a plurality of possible peripherals. Possible peripherals may include various physical objects and/or physical devices proximate to a user. In some implementations, the peripheral identification module 126 may be configured to identify the peripheral based on the output signal of the peripheral identification sensor 116. The peripheral identification module 126 may be configured to identify the peripheral based on the appearance and/or a visual aspect of the peripheral. For example, in some implementations, the peripheral identification module 126 may be configured to identify the peripheral based on graphics borne by the peripheral. According to some implementations, the peripheral identification module 126 may be configured to identify the peripheral by identifying a type of peripheral from among a plurality of peripheral types. Exemplary peripheral types may include a type of physical object, a type of physical device, and/or other peripheral types.

The content module 128 may be configured to adjust the interactive content outputted by the content output appliance 112. Adjustment of the interactive content may be based, at least in part, on the one or more position parameters as determined by the position module 124, on the identity of the peripheral and/or on the type of peripheral as determined by the peripheral identification module 126, and/or other factors. Adjusting the interactive content outputted by the content output appliance 112 may include adjusting the appearance, orientation, size, position, subject matter, sound, sound level, and/or other aspects of the interactive content.

The haptics module 130 may be configured to determine haptic feedback to be provided to the user. Haptic feedback may be experienced by the user via the peripheral 102, as described further in connection with FIGS. 2 and 3. Haptic feedback may include tactile feedback that takes advantage of a user's sense of touch. Haptic feedback may include forces, vibrations, motions, and/or other tactile feedback applied by the peripheral 102 to the user. The haptics module 130 may be configured to determine the haptic feedback based, at least in part, on the identification of the peripheral 102 as determined by the peripheral identification module 126. The haptics module 130 may be configured to determine the haptic feedback based, at least in part, on the one or more position parameters as determined by the position module 124. The haptics module 130 may be configured such that the haptic feedback is further based, at least in part, on the interactive content being output by the content output appliance 112. Information related to the haptic feedback to be provided to the user may be transmitted by the wireless transmitter/receiver 120.

FIG. 2 illustrates a peripheral 202, in accordance with one or more implementations of the invention. The peripheral 202 may be configured to enhance the interactivity of interactive content being conveyed to a user by the content output appliance 112. The peripheral 202 may constitute the peripheral 102 depicted in FIG. 1, according to some implementations. As depicted in FIG. 2, the peripheral 202 may include an accessory 204, a base device 206, and/or other components. Although the accessory 204 and the base device 206 are depicted in FIG. 2 as including certain components, this is not intended to be limiting as the accessory 204 and/or the base device 206 may include one or more of an actuator 208, a wireless transmitter/receiver 210, an actuator control 212, one or more identifying features 214, and/or other components. In some implementations, for example, the accessory 204 and/or the base device 206 may include (not depicted in FIG. 2) one or more of a battery, an audio playback device, an accelerometer, a motion detector, buttons, and/or other components.

The actuator 208 may be configured to generate haptic feedback for the user. Haptic feedback may include forces, vibrations, motions, a haptic component of a multimodal signal, and/or other tactile feedback applied by the peripheral 202 to the user. The actuator 208 may include a mechanical device configured to cause one or more motions of the peripheral 202. The actuator 208 may convert energy (e.g., electric, pneumatic, hydraulic, and/or other energy) in to mechanical energy resulting in one or motions of the peripheral 202. In some implementations, the actuator 208 may include an electric motor with an unbalanced mass on its driveshaft such that rotation of the driveshaft generates vibrations. The actuator 208 may be carried by the accessory 204 and/or the base device 206 in accordance with exemplary implementations.

The wireless transmitter/receiver 210 may be configured to wirelessly transmit information to and/or wirelessly receive information from one or more components of the system 100. As such, the wireless transmitter/receiver 210 may include a wireless transmitter, a wireless receiver, and/or a combined wireless transmitter and receiver. Information transmitted or received by the wireless transmitter/receiver 210 may be related to haptic feedback to be delivered to the user. For example, the wireless transmitter/receiver 210 may be configured to receive information from the one or more processors (e.g., the processor 122) defining one or more feedback parameters of the haptic feedback to be generated by the actuator 208. Feedback parameters may include the type of haptic feedback, the duration of haptic feedback, the intensity or magnitude of haptic feedback, frequency of periodic haptic signal, harmonic content of haptic signal, pattern of haptic pulses or aspects of haptic signal, static and/or changing deformation features, and/or other aspects of haptic feedback.

The actuator control 212 may be configured to control the actuator 208. The actuator control 212 may control the actuator 208 so as to cause the actuator 208 to generate haptic feedback for the user. The control of the actuator 208 by the actuator control 212 may be in accordance with information received from one or more processors (e.g., the processor 122) defining one or more feedback parameters. The actuator control 212 may be carried by the accessory 204 and/or the base device 206 in accordance with exemplary implementations.

The identifying features 214 may be configured to identify the peripheral 202 and/or the accessory 204 to the one or more processors (e.g., the processor 122). The identifying features 214 may identify the peripheral 202 and/or the accessory 204 from other peripherals and/or accessories that are usable with the interactive content. The one or more feedback parameters communicated from the one or more processors (e.g., the processor 122) to the peripheral 202 may be dependent on the identifying features of the peripheral 202 and/or the accessory 204. The identifying features may include graphics, markings, colors, and/or other visual traits.

The accessory 204 may be a physical object and/or a physical device configured to be associated with the base device 206. Association of the accessory 204 with the base device 206 may include physical coupling and/or other association. Physical coupling between the accessory 204 and the base device 206 may include removably attaching the accessory 204 to the base device 206, permanently attaching the accessory 204 to the base device 206, interchangeably coupling the accessory 204 and the base device 206, and/or other physical coupling. A plurality of accessories, such as the accessory 204, may be interchanged in the base device 206. The particular accessory associated with the base device 206 may affect the interactive content provided to the user via the content output appliance 112. The accessory 204 may bear certain graphics, which may constitute identifying features utilized by one or more modules of the processor 122.

According to some implementations, the accessory 204 may include a card-like or other paper-like physical form factor. Examples of such form factors may include collectible cards (e.g., sports cards and/or gaming cards), greeting cards (e.g., birthday cards), product brochures and/or other promotional materials, maps and/or other guides, books, magazines, newspapers, and/or other card-like or other paper-like form factors. The base device 206 may be configured to receive the accessory 204 such that the accessory 204 is removably coupled with the base device 206. As such, a plurality of accessories similar to the accessory 204 may be interchangeable in the base device 206. By way of non-limiting example, the base device 206 may include a slot in which an accessory (e.g., the accessory 204) having a card-like form factor may be inserted such that a portion of the accessory is visible. The base device 206 may be configured to provide haptic feedback to the user when the accessory 204 is coupled therewith. The haptic feedback provided to the user may be dependent on the accessory 204, where different accessories may result in different haptic feedback.

In some implementations, the accessory 204 may provide haptic feedback to the user without the base device 206. In such implementations, the base device 206 may be omitted from the system 100, or be used for other purposes. For example, the base device 206 may be used to store one or more accessories, charge one or more accessories, select one or more accessories, and/or otherwise complement the use of the accessory 204.

According to some implementations, in which the accessory 204 has a book-like form factor, one or more individual pages may include embedded information that triggers presentation of interactive content by the content output appliance 112 of the digital device 106. In such implementations, the book binding may constitute the digital device 106, while the particular page to which the book-like form factor is opened may constitute the accessory 204.

FIG. 3 illustrates a peripheral 302, in accordance with one or more implementations of the invention. The peripheral 302 may be configured to enhance the interactivity of interactive content being conveyed to a user by the content output appliance 112. The peripheral 302 may constitute the peripheral 102 depicted in FIG. 1, according to some implementations. As depicted in FIG. 2, the peripheral 302 may include one or more of an actuator 304, a wireless transmitter/receiver 306, an actuator control 308, one or more identifying features 310, an electronic display 312, a display control 314, a user interface 316, and/or other components. In some implementations, for example, the peripheral 302 may include (not depicted in FIG. 3) one or more of a battery, an audio playback device, an accelerometer, a motion detector, buttons, and/or other components. The actuator 304, the wireless transmitter/receiver 306, the actuator control 308, and/or the identifying features 310 may be similar, respectively, to the actuator 208, the wireless transmitter/receiver 210, the actuator control 212, and/or the identifying features 214 described in connection with FIG. 2. In some implementations, the identifying features 310 may include a subscriber identity module card 318, which may be removably coupled with the peripheral 302.

The electronic display 312 may be configured to display content (e.g., images, video, text, and/or other content) to the user. Content displayed by the electronic display 312 may include identifying features that can be used by one or more modules of the content output appliance 112. Content displayed by the electronic display 312 may include interactive content that is the same, similar to, and/or different than interactive content presented by the content output appliance 112 of the digital device 106. The electronic display 312 may be integrated with the peripheral 302 as a single device. The electronic display 312 may be separate from the peripheral 302 and communicatively coupled with the peripheral 302. According to some implementations, the electronic display 312 may include a touch screen configured to receive information from the user.

The display control 314 may be configured to control the electronic display 312. The display control 314 may control the electronic display 312 to present interactive content to the user that corresponds to the interactive content being conveyed to the user by the content output appliance 112. The display control 314 may control the electronic display 312 to present identifying features.

The user interface 316 may be configured to receive information from the user and/or provide information to the user. As such, the user interface 316 may include hardware and/or software to facilitate receiving information from the user and/or providing information to the user. Exemplary hardware may include one or more of buttons, dials, touch pads, and/or other hardware. In accordance with some implementations, some or all of the user interface 316 may be presented to the user via the electronic display 312. In implementations where the electronic display 312 includes a touch screen, the user may provide information to the user interface 316 by manipulating the touch screen.

In some implementations, the user interface 316 may be configured to present user configurable settings to the user. The user interface 316 may be configured to receive selections from the user of values for the user configurable settings. One or more user configurable settings may impact the haptic feedback that is generated by the actuator 304 of the peripheral 302. The user configurable settings may configure one or more aspects of operation of the actuator control 308 of the peripheral 302. The user configurable settings may be provided to one or more processors. In some implementations, the user configurable settings may be provided to the processor 122 of the digital device 106 by way of the wireless transmitter/receiver 306 of the peripheral 302.

According to some implementations, the peripheral 302 may include a mobile telephone, a digital music player, a personal digital assistant, a Smartphone, a wrist watch, an e-book reader, a laptop computer, a tablet computer, a remote control, a wearable computer (interactive clothing/accessories), a computing/interactive digital media device implanted in or on the user's body, and/or other mobile device. The mobile device may be configured for one or more of single-player gaming, multi-player gaming, social networking, interaction with virtual and/or augmented reality environments, interactive messaging and/or other communication, confirmation of remote manipulation (e.g., telerobotics, locking/unlocking real and/or virtual locks), interactive responses based on in-story character actions and/or plot developments in text-based and/or video-based stories, and/or other mobile applications.

In implementations that involve single-player gaming and/or multi-player gaming, haptic feedback may be provided to the user via the peripheral 302 responsive to events and/or interactions within a game. For example, the actuator 304 may vibrate during an explosion taking place in the game or during certain music within the game. In implementations that involve social networking, haptic feedback may be provided to the user via the peripheral 302 responsive to events and/or interactions within the social network. In one example, the actuator 304 may vibrate when the user obtains a friend in the social network.

In implementations that involve interactive messaging and/or other communication, communications may include haptic feedback. Such communications may include virtual touch communications where the user can feel the reaction of interactive messaging elements (e.g., emoticons). Such communications may include virtual touch objects coming in contact with one another, such as for example, a virtual hand associated with the user contacting another virtual hand triggering a haptic effect via the peripheral 302.

In implementations involving confirmation of remote manipulation, a virtual environment may be presented to the user (e.g., via the content output appliance 112 and/or the electronic display 312), which represents a real-world environments. Robots and/or other mechanisms within the real-world environment may be controlled by the user to interact with objects in the real-world environment. Those interactions may trigger haptic feedback provided by the peripheral 302.

In implementations involving interactive responses based on in-story character actions and/or plot developments in text-based and/or video-based stories, pre-defined character actions and/or plot developments may serve as trigger points for corresponding haptic feedback. For example, when an in-story character swings a baseball bat and hits a baseball, haptic feedback representing the impact of the ball against the bat may be provided via the peripheral 302.

As mentioned above, the peripheral 102 may include a toy. One or more components described in connection with the peripheral 202 and/or the peripheral 302 may be included in such a toy. Examples of a toy may include an action figure, a doll, a vehicle, a weapon, and/or other toys. A representation of the toy may be included in the interactive content outputted by the content output appliance 112 and/or other device. The user may experience haptic feedback via the toy responsive to actions performed by the representation of the toy may be included in the interactive content. For example, if the toy is an action figure and the representation of the toy is shown as walking in the interactive content, the toy may provide haptic feedback that corresponds to the walking. Haptic feedback may be triggered based at least in part on manipulations of the toy by the user. For example, if the toy is a weapon, simulated use of the weapon by the user may result in haptic feedback being provided by the toy.

Figure 4:
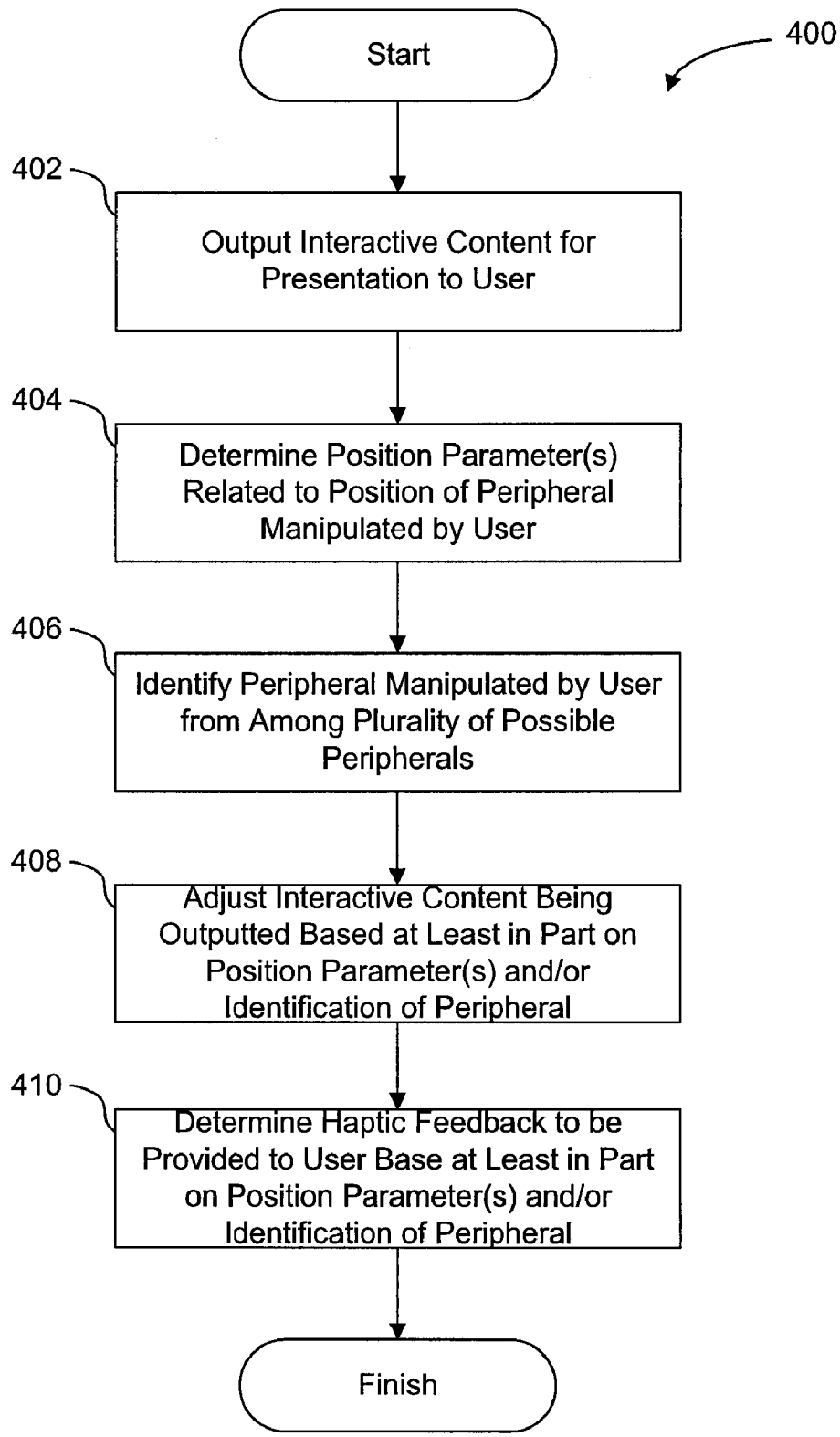
FIG. 4 illustrates a method for interacting with interactive content being conveyed to a user by a content output appliance, in accordance with one or more implementations of the invention.

FIG. 4 illustrates a method 400 for interacting with interactive content being conveyed to a user by a content output appliance, in accordance with one or more implementations of the invention. The operations of the method 400 presented below are intended to be illustrative. In some implementations, the method 400 may be accomplished with one or more additional operations not described, and/or without one or more of the operations discussed. Additionally, the order in which the operations of the method 400 are illustrated in FIG. 4 and described below is not intended to be limiting.

In some implementations, the method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 400 in response to instructions stored electronically on an electronic storage medium. The one or more processing devices may include one or more devices configured through hardware, firmware, and/or software to be specifically designed for execution of one or more of the operations of the method 400.

At an operation 402, interactive content may be outputted to a user. In some implementations, the interactive content may be outputted by the content output appliance 112 of the digital device 106 and/or the electronic display 312 of the peripheral 302. The content to be outputted may be determined by the content module 128, in some implementations.

At an operation 404, one or more position parameters that are related to the position of a peripheral being manipulated by the user may be determined. The one or more position parameters may be determined in conjunction with the position module 124, according to some implementations. The imaging device 114 and/or the position sensor 118 may be utilized in determining the one or more position parameters.

At an operation 406, the peripheral being manipulated by the user may be identified from among a plurality of possible peripherals. The peripheral identification module 126 may be executed to identify the peripheral being manipulated by the user. In some implementations, the imaging device 114 and/or the peripheral identification sensor 116 may be utilized in identifying the peripheral being manipulated by the user.

At an operation 408, the interactive content being outputted may be adjusted. This adjustment may be based at least in part on one or more of the position parameter(s) determined at the operation 404, the identification of the peripheral being manipulated by the user at the operation 406, and/or other factors. The content module 128 may be executed to perform the operation 408 in some implementations.

At an operation 410, haptic feedback to be provided to the user is determined. This determination may be based at least in part on the position parameter(s) determined at the operation 404, the identification of the peripheral being manipulated by the user at the operation 406, and/or other factors. The haptics module 130 may be executed to perform the operation 410, in accordance with some implementations.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A peripheral configured to enhance the interactivity of interactive content being conveyed to a user by a content output appliance, wherein the content output appliance is under control of one or more processors that control the output of the interactive content based on one or more state parameters of the peripheral, the peripheral comprising:
   an actuator configured to generate haptic feedback for the user;
   an accessory;
   a base device configured to be removably coupled to the accessory such that any of a plurality of accessories can be interchangeably coupled to the base device;
   a wireless receiver carried by the base device, the wireless receiver being configured to receive information from the one or more processors defining one or more feedback parameters of the haptic feedback to be generated by the actuator;
   an actuator control configured to control the actuator to generate haptic feedback for the user in accordance with the received information defining the one or more feedback parameters; and
   one or more identifying features carried by the accessory, the one or more identifying features being configured to identify the peripheral to the one or more processors from other peripherals that are usable with the interactive content such that the one or more feedback parameters communicated from the one or more processors to the peripheral are dependent on the identifying features of the peripheral.

2. The peripheral of claim 1, wherein one or both of the actuator and/or the actuator control are carried by the accessory.

3. The peripheral of claim 1, wherein one or both of the actuator and/or the actuator control are carried by the base device.

4. The peripheral of claim 1, wherein the accessory is a card bearing graphics.

5. The peripheral of claim 4, wherein the one or more identifying features comprise the graphics.

6. The peripheral of claim 1, further comprising:
   an electronic display; and
   a display control configured to control the electronic display to present interactive content to the user that corresponds to the interactive content being conveyed to the user by the content output appliance.

7. The peripheral of claim 1, further comprising a user interface configured to present user configurable settings to the user, and to receive selections from the user of values for the user configurable settings, and wherein user configurable settings impact the haptic feedback that is generated by the actuator.

8. The peripheral of claim 7, wherein the user configurable settings configure one or more aspects of operation of the actuator control.

9. The peripheral of claim 7, wherein the user configurable settings are provided to the one or more processors.

10. The peripheral of claim 1, wherein the one or more identifying features comprise a subscriber identity module card.

* * * * *